(12) United States Patent
Kim

(10) Patent No.: US 6,556,252 B1
(45) Date of Patent: Apr. 29, 2003

(54) DEVICE AND METHOD FOR PROCESSING SUB-PICTURE

(75) Inventor: Dae Joong Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/499,632

(22) Filed: Feb. 8, 2000

(30) Foreign Application Priority Data

Feb. 8, 1999 (KR) .................................................. 99-4255

(51) Int. Cl.[7] .................................................. H04N 5/45
(52) U.S. Cl. .................... 348/565; 348/564; 348/521
(58) Field of Search .................... 348/565, 563, 348/564, 566, 567, 569, 570, 521, 523, 524, 525; H04N 5/45

(56) References Cited

U.S. PATENT DOCUMENTS

| | | | | |
|---|---|---|---|---|
| 5,506,628 A | * | 4/1996 | Chun | 348/565 |
| 5,657,092 A | * | 8/1997 | Kim | 348/565 |
| 5,729,300 A | * | 3/1998 | Ahn | 348/564 |
| 5,754,253 A | * | 5/1998 | Lee | 348/565 |
| 5,818,541 A | * | 10/1998 | Matsuura et al. | 348/565 |
| 5,969,769 A | * | 10/1999 | Hamadate | 348/563 |
| 5,978,046 A | * | 11/1999 | Shintani | 348/565 |
| 5,990,975 A | * | 11/1999 | Nan et al. | 348/525 |
| 6,011,594 A | * | 1/2000 | Takashima | 348/468 |
| 6,307,597 B1 | * | 10/2001 | Patton et al. | 345/213 |
| 6,384,868 B1 | * | 5/2002 | Oguma | 348/564 |

* cited by examiner

Primary Examiner—John Miller
Assistant Examiner—Jean W. Désir
(74) Attorney, Agent, or Firm—Birch, Stewart, Kolasch & Birch, LLP

(57) ABSTRACT

A device and method for processing a sub-picture in a TV receiver is disclosed. The present invention allows a viewer to freely move the position of a sub-picture in both left⇌right and top⇌bottom directions, such that even a portion of the sub-picture may be displayed on the screen.

24 Claims, 16 Drawing Sheets

(a)    (b)

(step 403)

(step 404)

(step 406)

(step 409)

(step 410)

DEVICE AND METHOD FOR PROCESSING SUB-PICTURE

BACKGROUND OF THE INVENTION

1. Field of the Invention

The present invention relates to a television receiver which permits a viewer to simultaneously watch a main picture and a sub-picture, and more particularly, to a device for processing a sub-picture for such a television.

2. Background of the Related Art

As the technology in television (TV) advances, a TV system which permits a viewer to simultaneously watch both a main picture and a sub-picture has been developed. For example, if a scene of a decoded main picture and a decoded sub-picture is as shown in FIG. 1, a simultaneous display of the main picture and the sub-picture according to a Picture In Picture (PIP) function is as shown in FIG. 2.

The sub-picture may be used to search for another channel. Thus, when the sub-picture covers an important part of the main picture, the sub-picture may be moved to another position. However, the sub-picture must at times be turned on and off because the movement of the sub-picture is limited. Also, a size of the sub-picture display can be reduced, but there too is a limitation of the size reduction. As a result, the PIP function may be cumbersome to a viewer.

Typically, the sub-picture as shown in FIG. 3A is respectively sub-sampled by 1/N and 1/M in width and length, i.e. one line is taken out of M vertical lines and one line is taken out of N horizontal lines, to become the sub-picture as shown in FIG. 3B. Therefore, displaying only a portion of the sub-sampled sub-picture requires sub-sampling of all regions of the received sub-picture, storing the receives sub-picture in a frame memory, and reading only the portion to be displayed. Thus, complicated logics, such as a multiplier for addressing, is necessary.

SUMMARY OF THE INVENTION

Accordingly, an object of the present invention is to solve at least the problems and disadvantages of the related art.

An object of the present invention is to provide a device for processing a sub-picture, which permits a free movement of the sub-picture on a main picture.

Another object of the present invention is to provide a device for processing a sub-picture, which permits a free adjustment of the sub-picture size.

A further object of the present invention is to provide a device for processing a sub-picture, which displays a portion of the sub-picture by a simple memory indexing.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve these and other advantages and in accordance with the purpose of the present invention, as embodied and broadly described, the device for processing a sub-picture in a TV receiver includes a PIP synchronizing generator for receiving an input signal from an external device, receiving a main picture synchronizing signal, and generating information on a PIP; a read timing generator for generating a read signal from a synchronizing signal for displaying the sub-picture generated at the PIP synchronizing generator; a write timing generator for generating a write signal by using the sub-picture synchronizing signal and an output of the PIP synchronizing generator; a sub-sampler for selecting and sub-sampling only a portion of the sub-picture data to be displayed, the sub-picture data being provided in response to the write signal from the write timing generator; a sub-picture frame memory for storing the sub-picture data sub-sampled at the sub-sampler and presenting the stored sub-picture data in response to the read signal generated at the read timing generator; and a multiplexer for multiplexing the decoded main picture data and the sub-picture data read from the sub-picture frame memory.

The PIP synchronizing generator generates the synchronizing signals for lines of the sub-picture to be displayed on the main picture, and a signal representing a line counted from a top side of the sub-sampled sub-picture to which the sub-picture is not to be displayed and a number of lines to be displayed, using the information on sub-picture vertical starting point coordinates, sub-picture length and main picture line. The synchronizing signals for the lines of the sub-picture to be displayed on the main picture are activated at lines on which the sub-picture is displayed.

Also, the PIP synchronizing generator generates synchronizing signals for columns of the sub-picture to be displayed on the main picture, and a signal representing a pixel counted starting from a left most side of the sub-sampled sub-picture up to which the sub-picture is not to be displayed and a number of pixels per line to be displayed, using the information on sub-picture horizontal starting point coordinates, a sub-picture width and main picture column. The synchronizing signals for columns of the sub-picture to be displayed on the main picture are activated on columns at which the sub-picture is displayed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Generally, the present device for processing a sub-picture allows a sub-picture to be moved freely on the main picture, such that a portion of the sub-picture is displayed if the absolute size of the sub-picture is positioned outside the main picture. Particularly, if the sub-picture is scrolled to the left, the sub-picture may completely disappear and then reappear from the right side of the main picture. Similarly, a sub-picture scrolled to the right disappears and reappears from the left side of the main picture, a sub-picture scrolled to the top disappears and reappears from the bottom side of the main picture and a sub-picture scrolled to the bottom disappears and reappears from the top side of the main picture. Moreover, the present invention permits a simple memory indexing even if a portion the sub-picture is sub-sampled, stored, and displayed.

Figure 1:
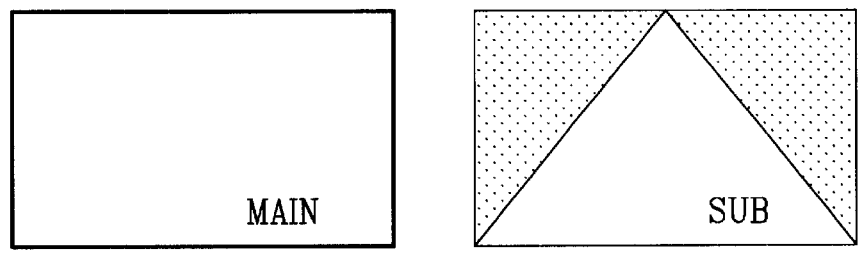
FIG. 1 shows an example of a main picture and a sub-picture in the related art.
Figure 2:
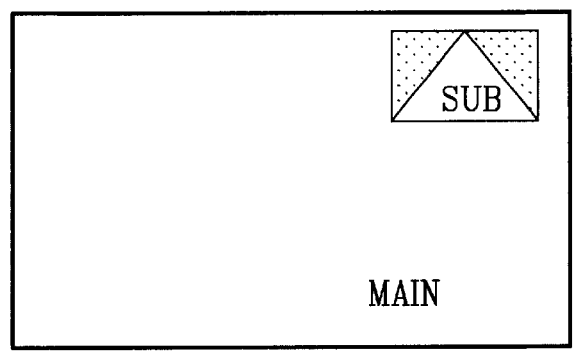
FIG. 2 shows an example of a simultaneous display of a main picture and a sub-picture in the related art.
Figure 3:
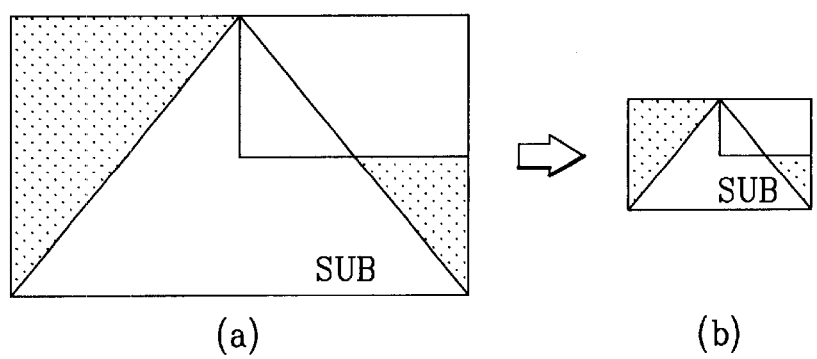
FIGS. 3A and 3B show an example of sub-sampling a sub-picture in the related art.
Figure 4:
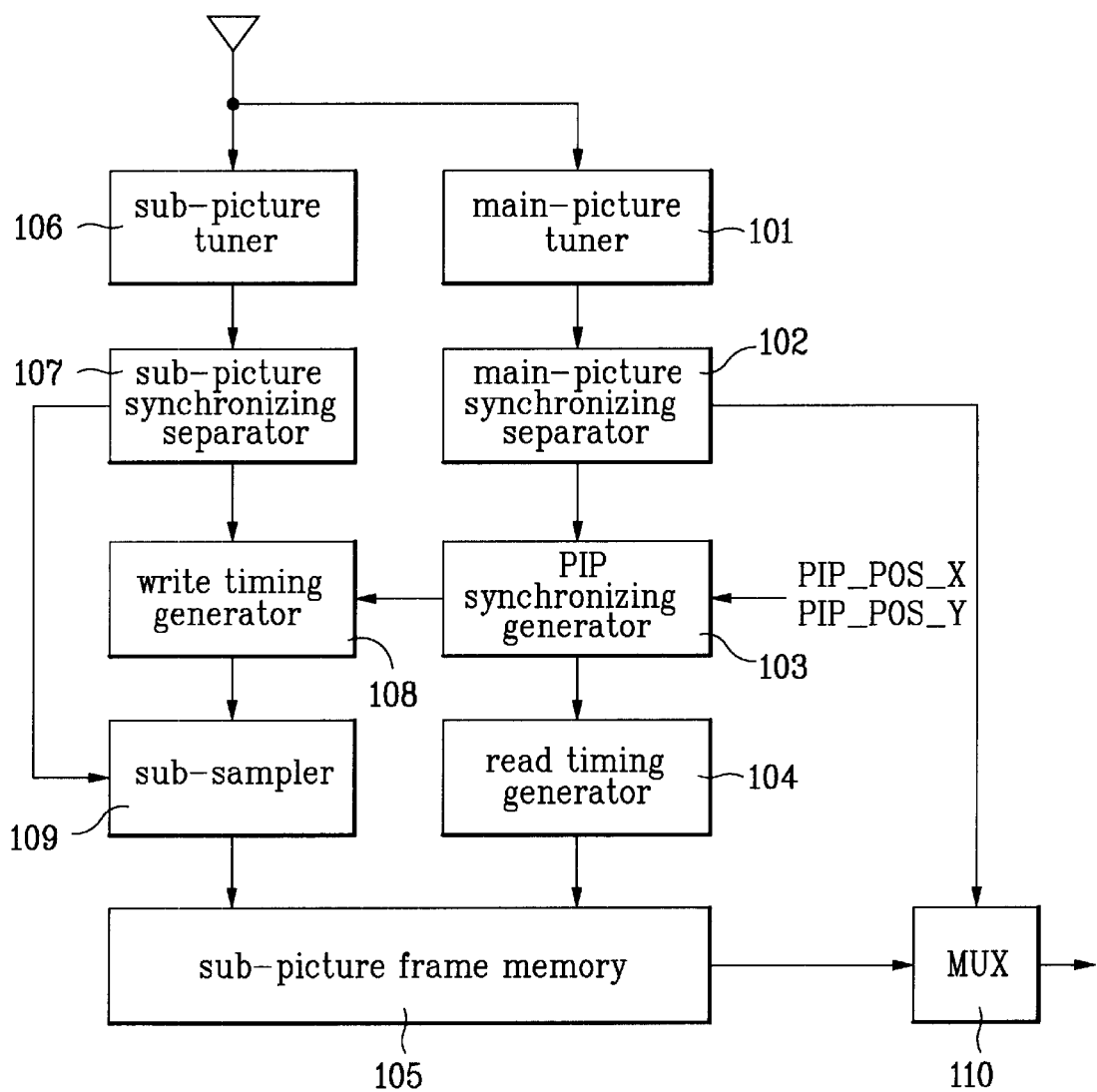
FIG. 4 is a block diagram of a TV receiver in accordance with an embodiment of the present invention.

FIG. 4 illustrates a block diagram of a device for processing a sub-picture in accordance with an embodiment of the present invention, including a main picture tuner 101 which separates data for a main picture from an input signal; a main picture synchronizing separator 102 which extracts a main picture synchronizing signal from the main picture data; a PIP synchronizing generator 103 which receives PIP_POS_X and PIP_POS_Y information from an external device and generates information on synchronizing signals PIP_HSYNC and PIP_VSYNC, a PIP line offset PIP_LINE_OFFSET, a PIP column offset PIP_COLUMN_OFFSET, a PIP display height PIP_DISP_HEIGHT and a PIP display width PIP_DISP_WIDTH for displaying the sub-picture, where the signals are synchronous to the main picture synchronizing signal; and a read timing generator 104 which generates a read signal using the PIP_HSYNC and PIP_VSYNC signals for reading a sub-picture from a sub-picture frame memory. Here, the PIP_POS_X and PIP_POS_Y are coordinates of a point at which the sub-picture is to be inserted.

The device also includes a sub-picture tuner 106 which separates data for the sub-picture from the input signal; a sub-picture synchronizing separator 107 which extracts a sub-picture synchronizing signal from the sub-picture data; a write timing generator 108 which generates a write signal using the sub-picture synchronizing signal and the output of the PIP synchronizing generator 103 for sub-sampling a portion of the sub-picture data provided through the sub-picture synchronizing separator 107; a sub-sampler 109 which sub-samples the sub-picture signal according to the write signal to reduce the sub-picture signal input with the size of the main picture; a sub-picture frame memory 105 which stores the sub-picture data sub-sampled at the sub-sampler 109 and presents the sub-picture data according to the read signal generated by the read timing generator 104; and a multiplexer 110 which multiplexes and outputs the main picture data from the main picture synchronizing separator 102 and the sub-picture data from the sub-picture frame memory 105. Here, the sub-sampler 109 sub-samples the sub-picture signal by 1/N in width and 1/M in length, where N and M are natural numbers.

Figure 5:
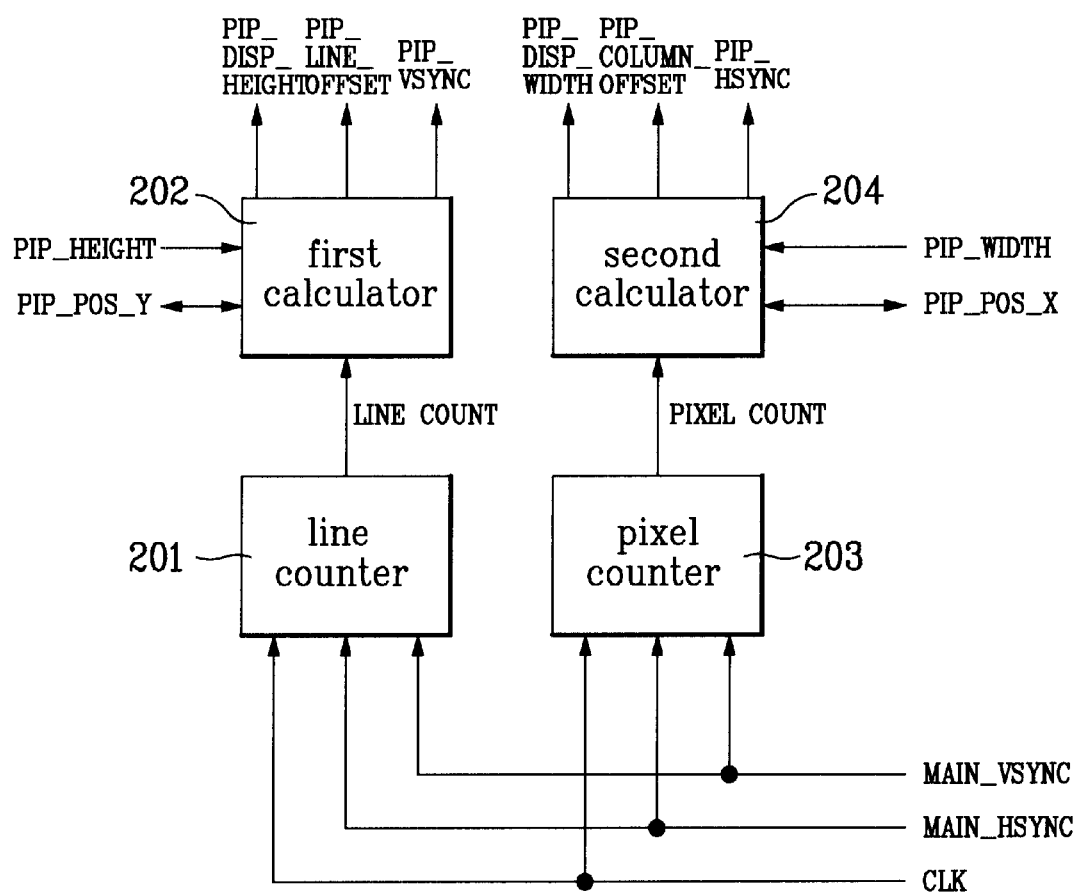
FIG. 5 is a block diagram of the PIP synchronizing generator in FIG. 4 according to an embodiment of the present invention.

FIG. 5 is a block diagram of the PIP synchronizing generator 103 including a line counter 201 which receives a vertical synchronizing signal MAIN_VSYNC and a horizontal synchronizing signal MAIN_HSYNC for the main picture, both signals synchronous to the main picture data, and counts a number of MAIN_HSYNC signals within an effective MAIN_V SYNC signal; a first calculator 202 which generates the PIP_VSYNC, the PIP_LINE_OFFSET and PIP_DISP_HEIGHT information which are synchronous to the main picture data, using the PIP_POS_Y, PIP_HEIGHT and the count value from the line counter 201; a pixel counter 203 which receives the MAIN_VSYNC and MAIN_HSYNC signals, and Counts a number of clocks within an effective MAIN_HSYNC signal; and a second calculator 204 which generates the PIP_HSYNC, the PIP_COLUMN_OFFSET, and the PIP_DISP_WIDTH information which are synchronous to the main picture data, using the PIP_POS_X, the PIP_WIDTH and the count value from the pixel counter 203.

Figure 6:
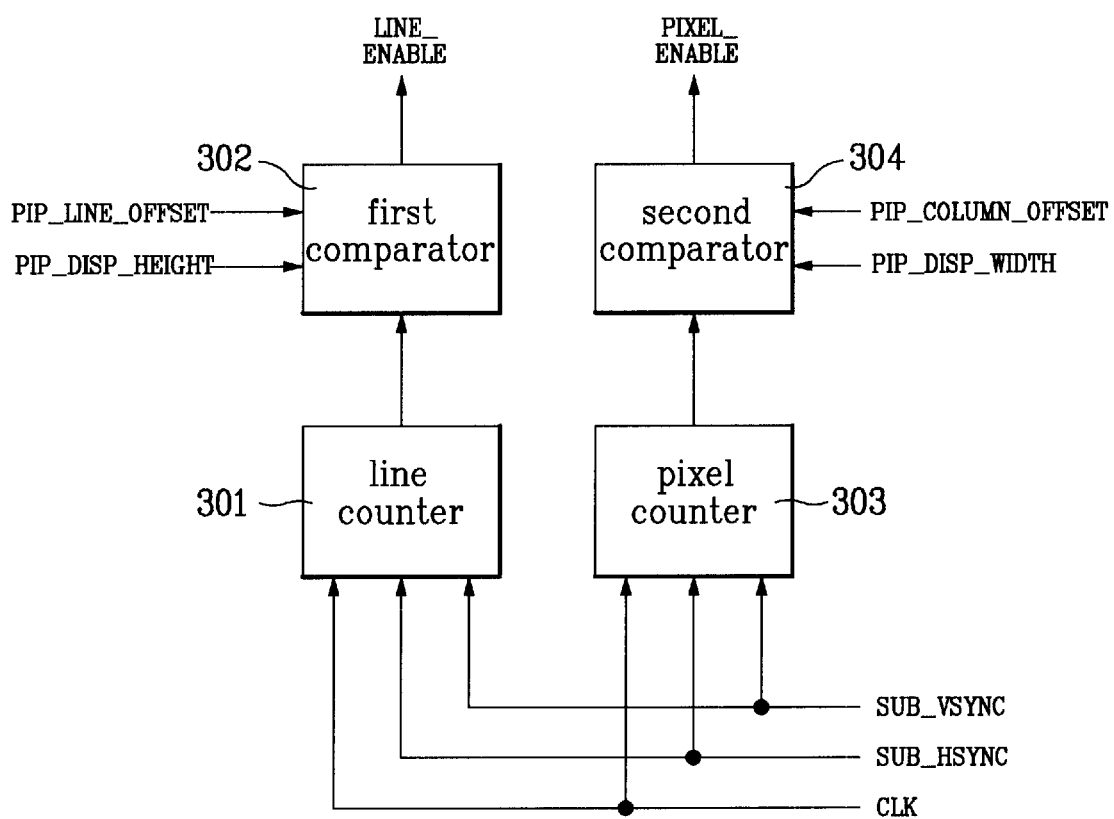
FIG. 6 is a block diagram of the write timing generator in FIG. 4 according to an embodiment of the present invention.

Also, FIG. 6 is a block diagram of the write timing generator 108 including a line counter 301 which receives a sub-picture vertical synchronizing signal SUB_VSYNC and a sub-picture horizontal synchronizing signal SUB_HSYNC, both signals synchronous to the sub-picture data, and counts a number of SUB_HSYNC signals within an effective SUB_VSYNC signal; a first comparator 302 which activates a line enable signal LINE_ENABLE when the value counted by the line counter 301 is greater than the PIP_LINE_OFFSET information and smaller than the PIP_DISP_HEIGHT; a pixel counter 303 which receives the SUB_VSYNC signal and the SUB_HSYNC signal, and counts a number of clocks CLK within an effective SUB_HSYNC signal; and a second comparator 304 which activates a pixel enable signal PIXEL_ENABLE when the value counted by the pixel counter 303 is greater than the PIP_COLUMN_OFFSET information and smaller than the PIP_DISP_WIDTH information.

The operation of the present device for processing a sub-picture will next be explained. The main-picture tuner 101 separates the main picture data from the input signal and outputs the data to the main-picture synchronizing separator 102, and the sub-picture tuner 106 separates sub-picture data from the input signal and outputs the separated data to the sub-picture synchronizing separator 107. The main picture synchronizing separator 102 extracts the MAIN_VSYNC signal and the MAIN_HSYNC signal of the main picture from the main picture data, and outputs these signals to the PIP synchronizing generator 103. The main picture data is output to the multiplexer 110. The sub-picture synchronizing separator 107 extracts the SUB_VSYNC signal and the SUB_HSYNC signal of the sub-picture, and outputs these signals to the write timing generator 108.

Figure 7:
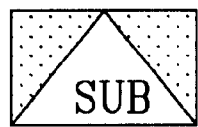
FIG. 7 shows an example of coordinates for a main picture starting point and coordinates for a sub-picture starting point according to an embodiment of the present invention.

For purposes of explanation, assume that the main picture has a width of MAIN_WIDTH and a length of MAIN_HEIGHT, while the sub-sampled sub-picture has a width of PIP_WIDTH and a length of PIP_HEIGHT. Also, assume that if a top left corner pixel of the main picture has coordinates of (0, 0) as shown in FIG. 7, a top right pixel has coordinates of (MAIN_WIDTH−1, 0), a bottom left pixel has coordinates of (0, MAIN_HEIGHT−1) and a bottom right pixel has coordinates of (MAIN_WIDTH−1, MAIN_HEIGHT−1). Finally, assume that the top left coordinates at which the sub-picture is inserted is PIP_POS_X, PIP_POS_Y. The PIP_POS_X, PIP_POS_Y will then have value ranges on an absolute plane of the main picture as follows.

PIP_POS_X: [−PIP_WIDTH~MAIN_WIDTH]

PIP_POS_Y: [−PIP_HEIGHT~MAIN_HEIGHT]

Figure 8:
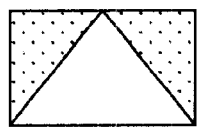
FIG. 8 shows an example when the sub-picture is positioned outside the main picture, to the right or left, according to an embodiment of the present invention.
Figure 8:
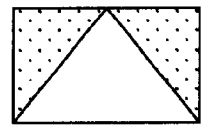
Figure 9:
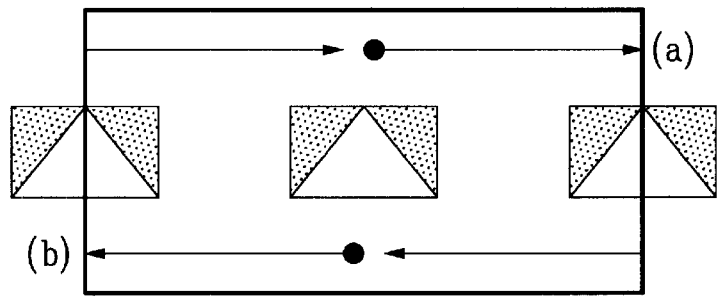
FIG. 9 shows an example of scrolling a sub-picture from the left or the right side of a main picture according to an embodiment of the present invention.

Particularly, when the PIP_POS_X is −PIP_WIDTH, the sub-picture is positioned completely outside of the main picture to the left such that the sub-picture is not displayed on the main picture, as shown in FIG. 8 at (a). However, if the −PIP_WIDTH is set to MAIN_WIDTH−1, the sub-picture is scrolled out to the left and scrolled in from the right side, as shown in FIG. 9 at (b). When the PIP_POS_X is MAIN_WIDTH, the sub-picture is positioned completely outside of the main picture to the right such that the sub-picture is not displayed on the main picture, as shown in FIG. 8B. If the MAIN_WIDTH is set to −PIP_WIDTH+1, the sub-picture is scrolled out to the right and scrolled in from the left side, as shown in FIG. 9 at (a).

Figure 10:
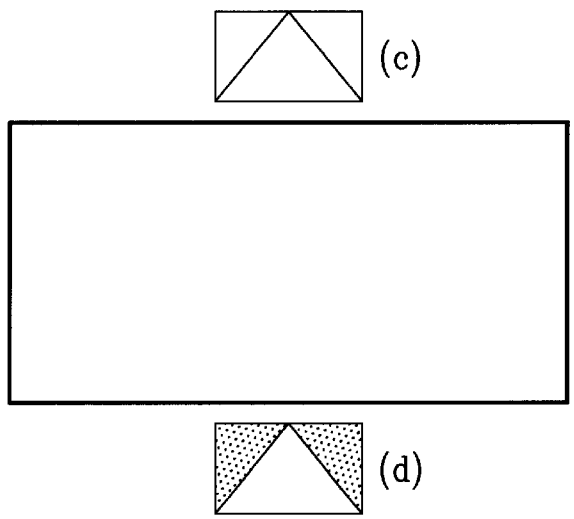
FIG. 10 shows an example when the sub-picture is positioned outside the main picture, on a top or bottom, according to an embodiment of the present invention.
Figure 11:
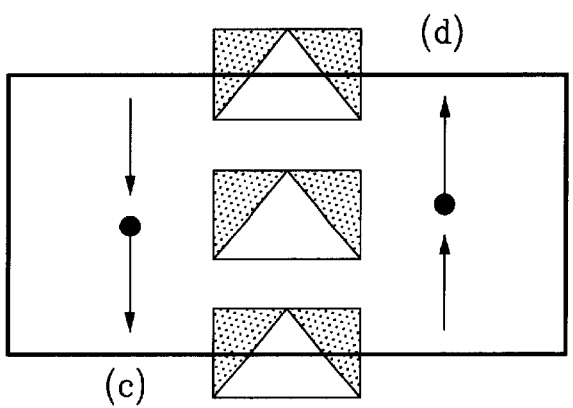
FIG. 11 shows an example of scrolling a sub-picture from the top or the bottom side of a main picture according to an embodiment of the present invention.

Also, when the PIP_POS_Y is −PIP_HEIGHT, the sub-picture is positioned above and outside of the main picture, as shown in FIG. 10 at (c), and when the PIP_POS_Y is MAIN_HEIGHT, the sub-picture is positioned below and outside of the main picture, as shown in FIG. 10 at (d). When the PIP_POS_Y is −PIP_HEIGHT and the −PIP_HEIGHT is set to MAIN_HEIGHT−1, the sub-picture is scrolled out to the top and scrolls in from the bottom side, as shown in FIG. 11 at (d). When the PIP_POS_Y is MAIN_HEIGHT and the MAIN_HEIGHT is set to PIP_HEIGHT+1, the sub-picture is scrolled out to the bottom and scrolled in from the top side, as shown in FIG. 11 at (c).

The PIP_POS_X and the PIP_POS_Y are variables which can be changed by an external input device, such as a remote controller. The PIP synchronizing generator 103 receives the PIP_POS_X and the PIP_POS_Y from the external input device, and generates the sub-picture synchronizing signals PIP_HSYNC and PIP_VSYNC which are synchronous to the main picture synchronizing signals. MAIN_VSYNC and MAIN_HSYNC. The PIP synchronizing generator 103 also generates information on the PIP line offset PIP_LINE_OFFSET, the PIP column offset PIP_COLUMN_OFFSET, the PIP display height PIP_DISP_HEIGHT, and the PIP display width PIP_DISP_WIDTH.

Particularly, the PIP_VSYNC is a synchronizing signal for lines displayed as the sub-picture on the main picture, and the PIP_HSYNC is a synchronizing signal for columns displayed as the sub-picture on the main picture. The PIP_LINE_OFFSET is information on a line up to which the sub-picture is not displayed, counting from the top of the sub-sampled sub-picture, and the PIP_COLUMN_OFFSET is information on a pixel up to which the sub-sampled sub-picture is not displayed, counting from the left most pixel of the sub-picture. Finally, the PIP_DISP_HEIGHT is a number of displayed lines of the sub-sampled sub-picture, and the PIP_DISP_WIDTH is a number of displayed pixels per a line of the sub-sampled sub-picture.

Thus, the line counter 201 in the PIP synchronizing generator 103 receives the vertical synchronizing signal MAIN_VSYNC and the horizontal synchronizing signal MAIN_HSYNC, and counts a number of MAIN_HSYNC signals in an effective MAIN_VSYNC. The line count is the line information of the main picture. Accordingly, the first calculator 202 generates a PIP_VSYNC synchronous to the main picture, line information PIP_LINE_OFFSET of the sub-picture which is not displayed, and a number of lines PIP_DISP_HEIGHT which is not displayed, using the PIP_POS_Y signal, the PIP_HEIGHT signal and line count.

The pixel counter 203 counts a number of clock pulses within the effective horizontal synchronizing signal MAIN_HSYNC. The counted number of clock pulses is the main picture column information, i.e. the pixel count. The second calculator 204 then generates the PIP_HSYNC, the PIP_COLUMN_OFFSET and the PIP_DISP_WIDTH, which are synchronous to the main picture data, using the PIP_POS_X and the PIP_WIDTH signals and the pixel count.

At this time, the PIP_HSYNC signal is dependent upon the activated MAIN_HSYNC signal, such that the PIP_HSYNC signal is activated on a column at which the sub-picture is displayed. Also, the PIP_VSYNC signal is dependent upon the activated MAIN_VSYNC signal, such that the PIP_VSYNC signal is activated on a line on which the sub-picture is displayed. The PIP_HSYNC and the PIP_VSYNC signals are output to the read timing generator 104 for reading the sub-sampled sub-picture from the sub-picture frame memory 105.

Figure 17A:
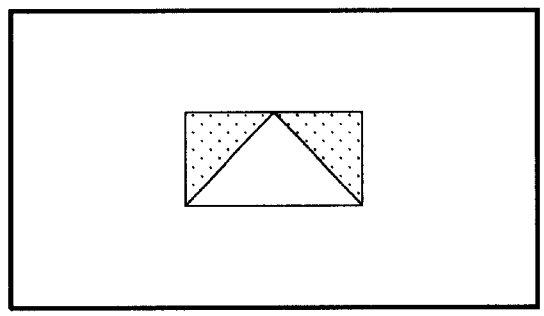
FIGS. 17A~17E show examples when either a portion or the whole sub-picture is displayed on a main picture according to an embodiment of the present invention.
Figure 17B:
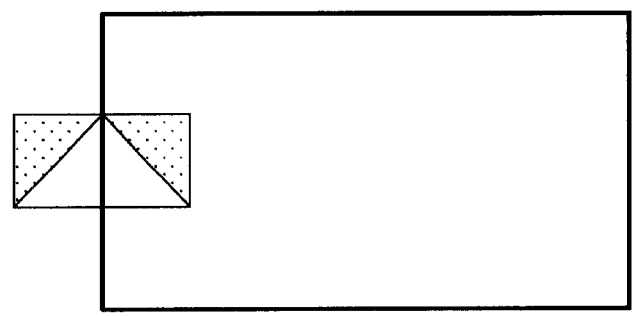
Figure 17C:
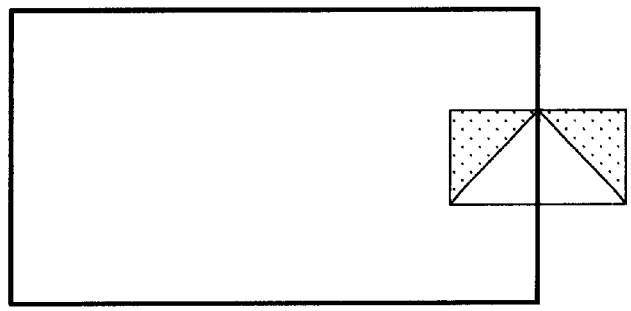
Figure 17D:
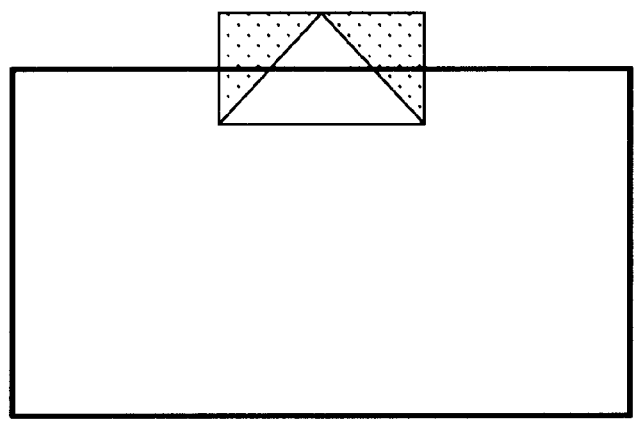
Figure 17E:
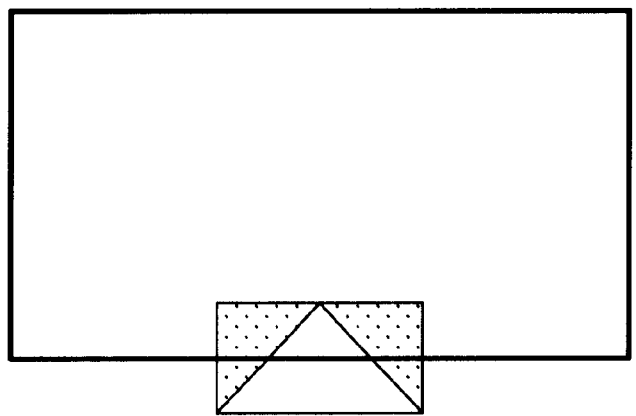
Figure 18A:
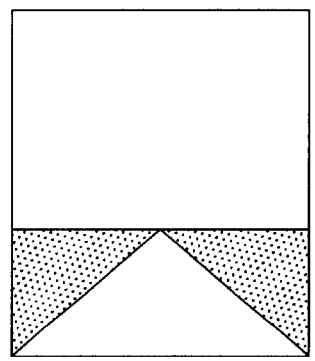
FIGS. 18A~18E are examples showing mapping of sub-picture frame memory to corresponding sub-picture position on a main picture according to an embodiment of the present invention.
Figure 18B:
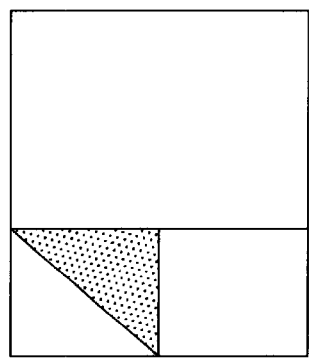
Figure 18C:
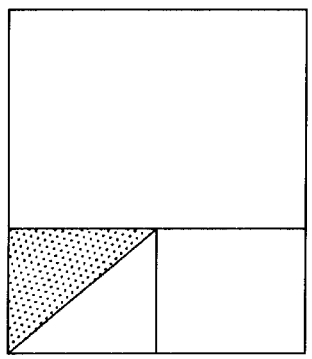
Figure 18D:
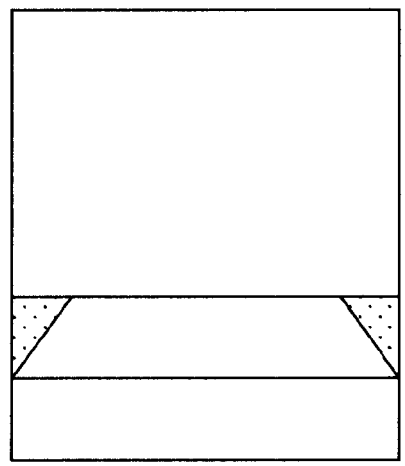
Figure 18E:
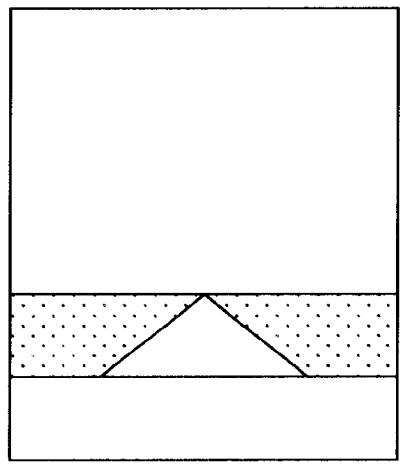

FIGS. 17A~17E illustrate examples in which the sub-picture can be positioned with reference to the main picture. As shown in FIG. 17A, when all portions of the sub-sampled sub-picture are displayed, the PIP_LINE_OFFSET and the PIP_COLUMN_OFFSET are '0,' and the PIP_DISP_HEIGHT and the PIP_DISP_WIDTH are the PIP_HEIGHT and the PIP_WIDTH, respectively. If the sub-picture is positioned outside of the main picture to the left as shown in FIG. 17B, the PIP_COLUMN_OFFSET is set to a non-zero value, and if the sub-picture is positioned above the main picture as shown in FIG. 17D, the PIP_LINE_OFFSET is set to a non-zero value. On the other hand, if the sub-picture is positioned outside of the main picture to the right or below the main picture as shown in FIGS. 17C and 17E, the PIP_LINE_OFFSET and PIP_COLUMN_OFFSET are '0' because the sub-picture is displayed starting from the first column and the first line. However, since all portions are not displayed, the sub-picture has a PIP_DISP_WIDTH and PIP_DISP_HEIGHT values corresponding to the amount displayed.

Figure 12A:
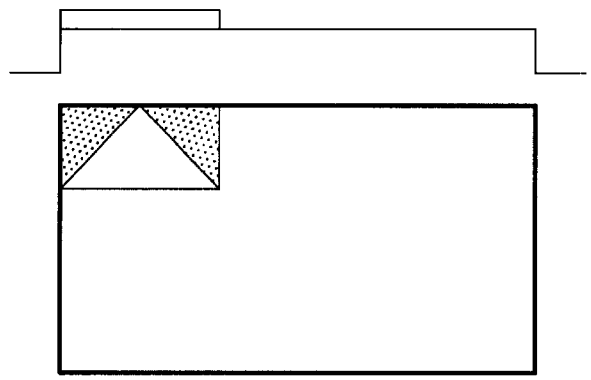
FIGS. 12A~12E show the example relations between a main picture horizontal synchronization MAIN_HSYNC, PIP_HSYNC, PIP_COLUMN_OFFSET and PIP_DISP_WIDTH according to an embodiment of the present invention.
Figure 12B:
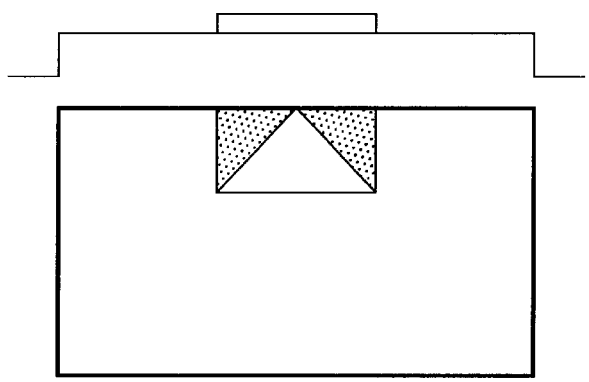
Figure 12C:
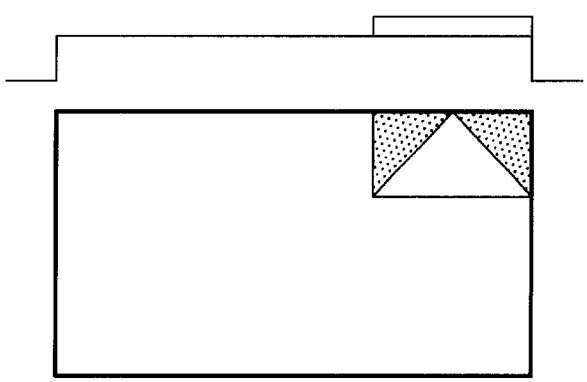

FIGS. 12A~12E are examples showing relations between the MAIN_HSYNC, PIP_HSYNC, PIP_COLUMN_OFFSET and PIP_DISP_WIDTH in the present invention, wherein a relation between the MAIN_HSYNC signal and the PIP_HSYNC signal is shown in an upper portion and a relation between the main picture and the sub-picture is shown in a lower portion. Namely, FIGS. 12A~12C are cases when the sub-picture is not positioned outside of the main picture, wherein the PIP_HSYNC signal is activated for a portion of the MAIN_HSYNC signal during which the sub-picture is displayed and the PIP_COLUMN_OFFSET is '0' because the sub-picture is positioned on the main picture.

Figure 12D:
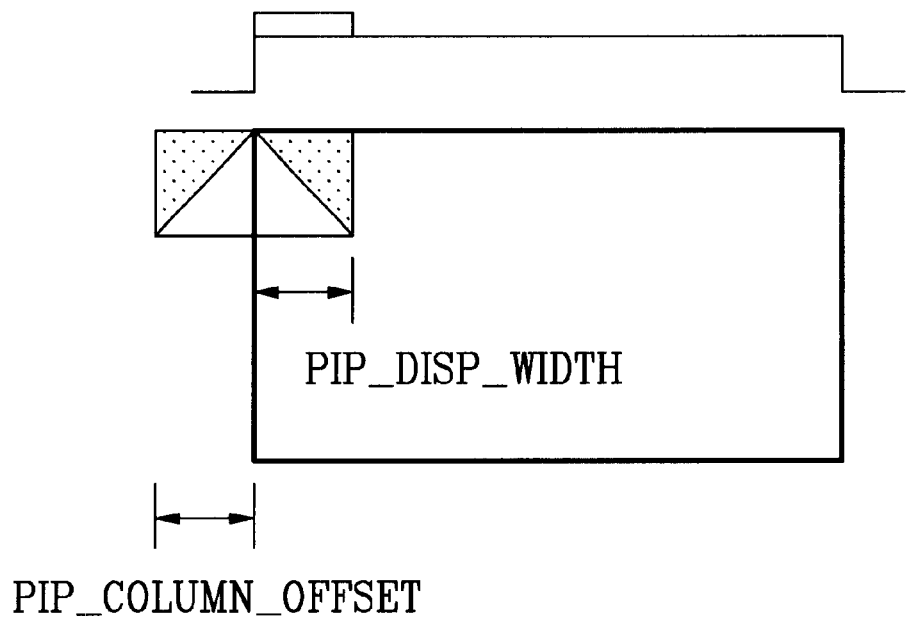
Figure 12E:
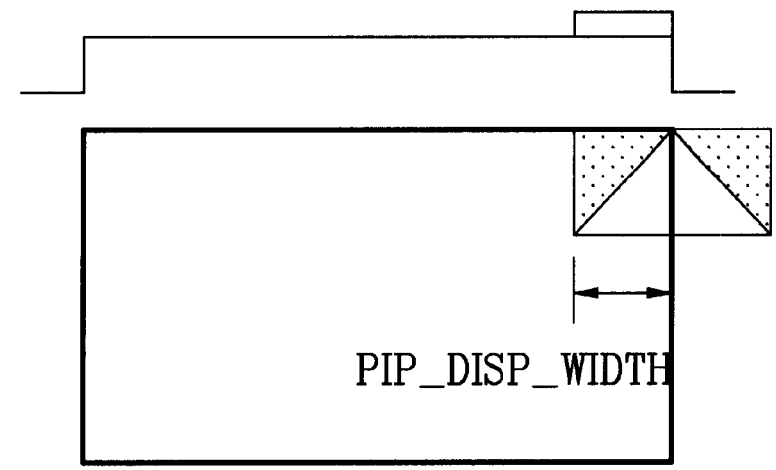

As shown in FIG. 12D, when the sub-picture is positioned outside of the main picture to the left, i.e. when the PIP_POS_X is negative, a portion of the sub-picture overlapped with the main picture is displayed. In this case, a number of columns in the sub-picture which is not displayed is the PIP_COLUMN_OFFSET value, and the PIP_HSYNC is activated for a portion of the MAIN_HSYNC during which the sub-picture is displayed. If the sub-picture is positioned outside of the main picture to the right as shown in FIG. 12E, the PIP_HSYNC signal is activated for a portion of the MAIN-HSYNC signal during which the sub-picture is displayed and the PIP_COLUMN_OFFSET is '0' as the sub-picture is displayed starting from the left.

Figure 13:
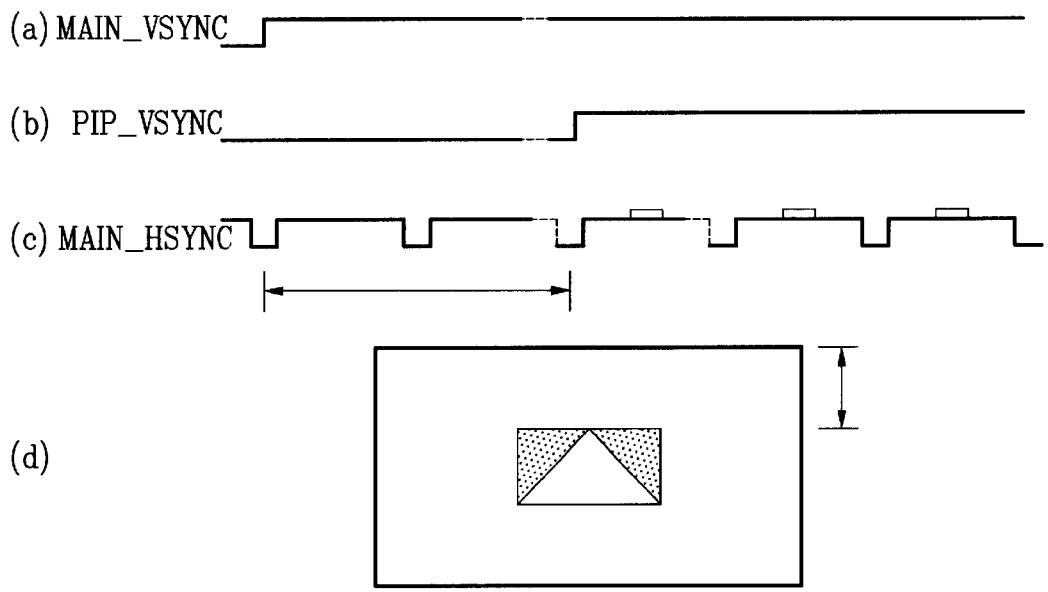
FIGS. 13A~13D show the example relations between MAIN_VSYNC, MAIN_HSYNC, PIP_VSYNC and PIP_HSYNC according to an embodiment of the present invention.
Figure 14:
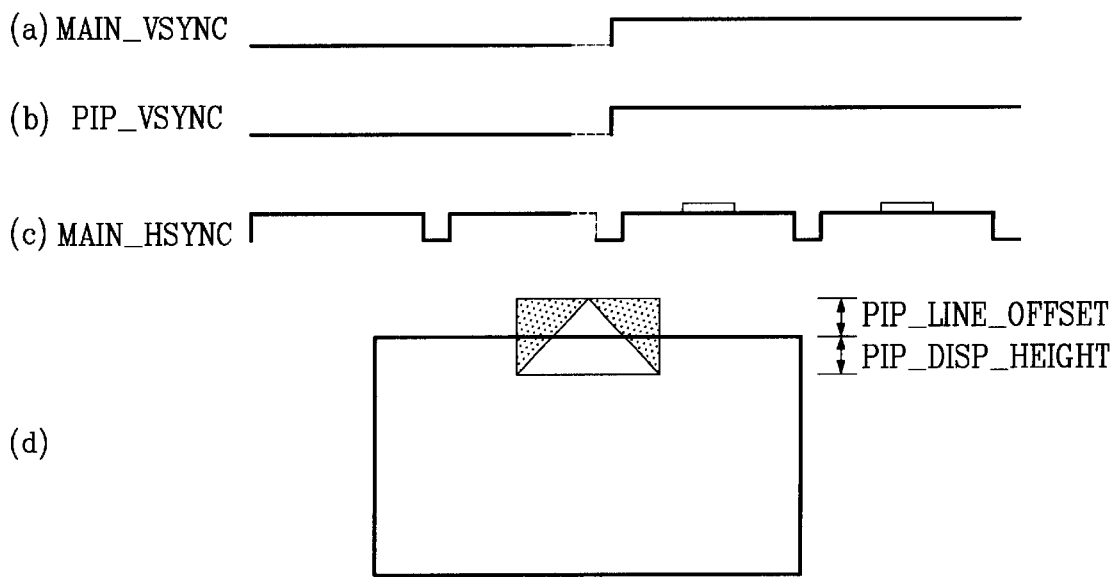
FIGS. 14A~14D show another example relations between MAIN_VSYNC, MAIN_HSYNC, PIP_VSYNC and PIP_HSYNC according to an embodiment of the present invention.

FIGS. 13A~13D and 14A~14D illustrate a first and a second embodiments showing relations between PIP_VSYNC and PIP_LINE_OFFSET. Particularly, as shown in FIGS. 13B and 14B, the PIP_VSYNC signal may be activated only for a portion of the main picture at which the sub-picture HSYNC signals overlaps with the main picture. If the sub-picture is positioned above the main picture as shown in FIG. 14D, i.e. when the PIP_POS_Y is negative, a number of lines of the sub-picture which are not displayed is the PIP_LINE_OFFSET information. Here, the values of the PIP_POS_Y, the PIP_LINE_OFFSET and PIP_DISP_HEIGHT can be determined by an algorithm shown in FIG. 15.

Figure 15:
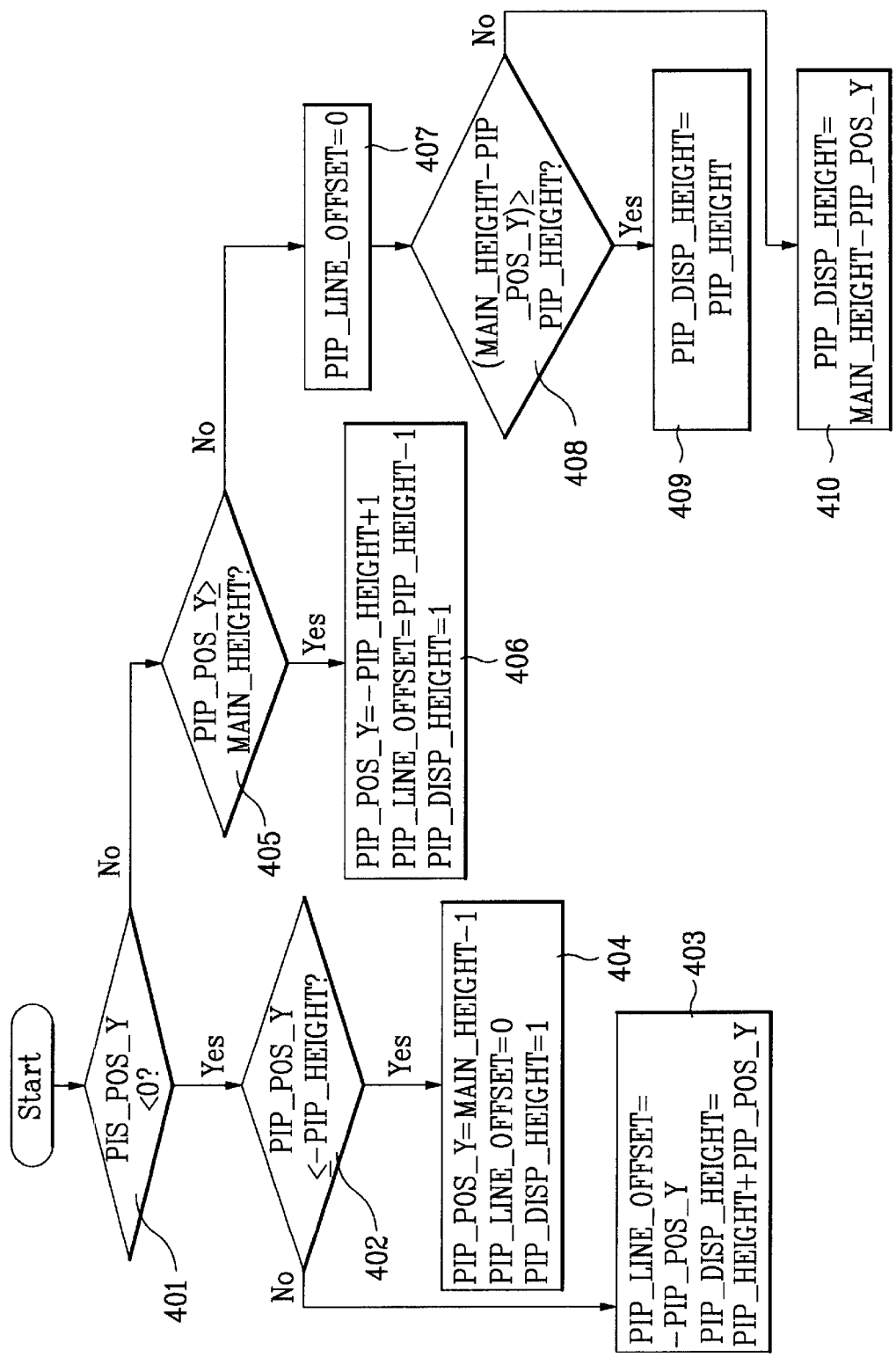
FIG. 15 is a flow chart of an algorithm determining PIP_POS_Y, PIP_LINE_OFFSET and PIP_DISP_HEIGHT in the first calculator in FIG. 5.
Figure 16A:
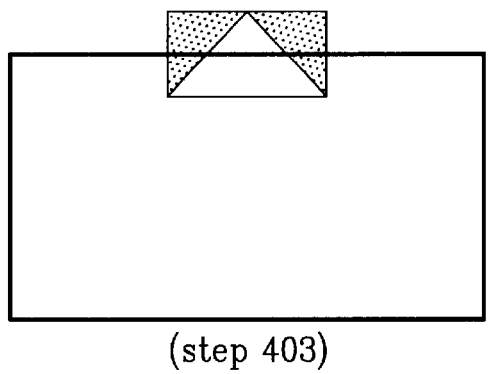
FIGS. 16A~16E show examples of sub-picture displays corresponding to respective states of FIG. 15.

Referring to FIG. 15, a determination is made whether the PIP_POS_Y is smaller than '0' (step 401). If the PIP_POS_Y is smaller than '0,' a portion of the sub-picture or the whole sub-picture is positioned above and outside of the main picture. Therefore, if the PIP_POS_Y is smaller than '0,' the PIP_POS_Y is compared to a –PIP_HEIGHT (step 402). As shown in FIG. 16A, if the PIP_POS_Y is greater than a –PIP_HEIGHT, which means that a portion of the sub-picture is positioned above the main picture the PIP_LINE_OFFSET is set to –PIP_POS_Y and the PIP_DISP_HEIGHT is set to PIP_HEIGHT+PIP_POS_Y (step 403).

Figure 16B:
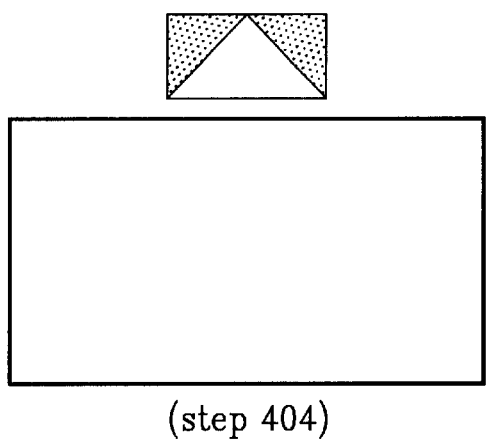

Otherwise, if the PIP_POS_Y is equal to or is smaller than –PIP_HEIGHT, the entire sub-picture is positioned above the main picture as shown in FIG. 16B. Accordingly, the PIP_POS_Y is changed to MAIN_HEIGHT-1, the PIP_LINE_OFFSET is changed to '0', and the PIP_DISP_HEIGHT is changed to '1' so that the sub-picture is scrolled in from the bottom side (step 404).

Figure 16C:
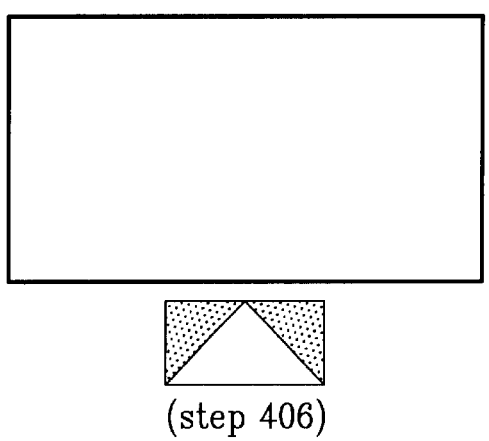

If the PIP_POS_Y is determined not to be smaller than '0' in step 401, the PIP_POS_Y is compared to the MAIN_HEIGHT (step 405). If the PIP_POS_Y is equal to or is greater than MAIN_HEIGHT, the entire sub-picture is positioned below the main picture as shown in FIG. 16C. Thus, the PIP_POS_Y is changed to –PIP_HEIGHT+1, the PIP_LINE_OFFSET is changed to PIP_HEIGHT-1, and the PIP_DISP_HEIGHT is changed to '1' so that the sub-picture is scrolled in from the top side (step 406).

Figure 16D:
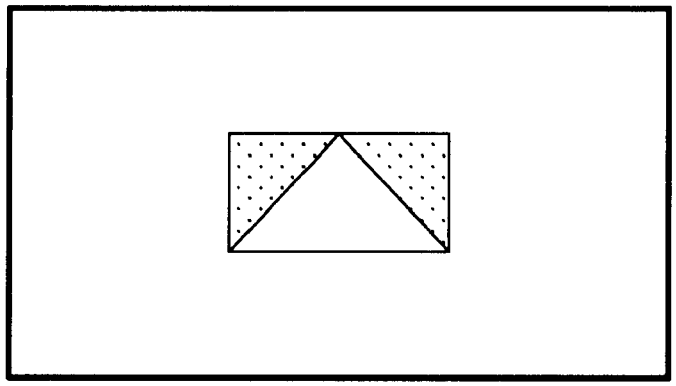
Figure 16E:
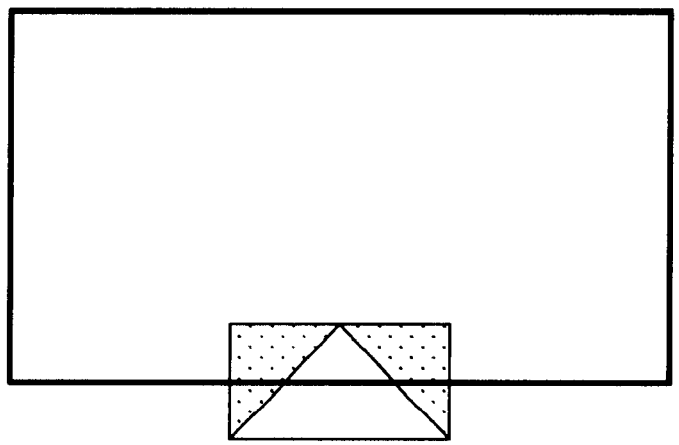

If the PIP_POS_Y is determined to be smaller than the MAIN_HEIGHT in step 405, the PIP_LINE_OFFSET is set to '0' (step 407), and the (MAIN_HEIGHT-PIP_POS_Y) is compared to PIP_HEIGHT (step 408). If it is determined that the (MAIN_HEIGHT-PIP_POS_Y) is equal to or is greater than PIP_HEIGHT, the entire sub-picture is positioned inside the main picture as shown in FIG. 16D. Thus, the PIP_DISP_HEIGHT is equal to PIP_HEIGHT (step 409). If the (MAIN_HEIGHT-PIP_POS_Y) is determined to be smaller than the PIP_HEIGHT in step 408, a portion of the sub-picture is positioned below the main picture as shown in FIG. 16E. Thus, the PIP_DISP_HEIGHT is equal to (MAIN_HEIGHT-PIP_POS_Y) (step 410).

Also, the values of the PIP_POS_X the PIP_COLUMN_OFFSET and the PIP_DISP_WIDTH are determined in an analogous manner. Namely, a determination is made whether the PIP_POS_X is smaller than '0.' If the PIP_POS_X is smaller than '0,' a portion of the sub-picture or the whole sub-picture is positioned outside of the main picture to the left, and if the PIP_POS_X is smaller than '0,' the PIP_POS_X is compared to a –PIP_WIDTH. If the PIP_POS_X is greater than a –PIP_WIDTH, a portion of the sub-picture is positioned out side the main picture to the left, and the PIP_COLUMN_OFFSET is set to –PIP_POS_X and the PIP_DISP_WIDTH is set to PIP_WIDTH+PIP_POS_X. Otherwise, if the PIP_POS_X is equal to or is smaller than –PIP_WIDTH, the entire sub-picture is positioned outside the main picture to the left. Accordingly, the PIP_POS_X is changed to MAIN_WIDTH-1, the PIP_COLUMN_OFFSET is changed to '0', and the PIP_DISP_WIDTH is changed to '1' so that the sub-picture is scrolled in from the right side.

If the PIP_POS_X is determined not to be smaller than '0,' the PIP_POS_X is compared to the MAIN_WIDTH and if the PIP_POS_X is equal to or is greater than MAIN_WIDTH, the entire sub-picture is positioned outside the main picture to the right. Thus, the PIP_POS_X is changed to –PIP_WIDTH+1, the PIP_COLUMN_OFFSET is changed to PIP_WIDTH-1, and the PIP_DISP_WIDTH is changed to '1' so that the sub-picture is scrolled in from the left side. If the PIP_POS_X is determined to be smaller than the MAIN_WIDTH, the PIP_COLUMN_OFFSET is set to '0,' and the (MAIN_WIDTH-PIP_POS_X) is compared to PIP_WIDTH. If the (MAIN_WIDTH-PIP_POS_X) is equal to or is greater than PIP_WIDTH, the entire sub-picture is positioned inside the main picture. Thus, the PIP_DISP_WIDTH is equal to PIP_WIDTH. However, if the (MAIN_WIDTH-PIP_POS_X) is smaller than the PIP_WIDTH, a portion of the sub-picture is positioned outside the main picture to the right. Thus, the PIP_DISP_WIDTH is equal to (MAIN_WIDTH-PIP_POS_X).

Moreover, the line counter 301 in the write timing generator 108 receives the sub-picture synchronizing signals SUB_HSYNC and SUB_VSYNC, synchronous to the sub-picture data from the sub-picture synchronizing separator 107, and counts a number of SUB_HSYNC within an effective SUB_VSYNC. The count number is the sub-picture line information. Also, the pixel counter 303 counts a number of clock signals/pulses CLK within an effective SUB_HSYNC and the counted number of clock signals/pulses is the sub-picture column information.

Assume that the sub-picture is sub-sampled by 1/N in width and 1/M in length. The value counted by the line counter 301 is modulo M operated and the quotient would be the PIP_HEIGHT if the remainder is '0.' Otherwise, the quotient plus a value of '1' would be the PIP_HEIGHT. Similarly, the value counted by the pixel counter 303 is modulo N operated and the quotient would be the PIP_

WIDTH if the remainder is '0.' Otherwise, the quotient plus a value of '1' would be the PIP_WIDTH.

Therefore, the first comparator 302 activates a line enable signal LINE_ENABLE when the value counted by the counter 301 is greater than the PIP_LINE_OFFSET information from the PIP synchronizing generator 103 and is smaller than the PIP_DISP_HEIGHT. The second comparator 304 activates a pixel enable signal PIXEL_ENABLE when the value counted by the pixel counter 303 is greater than PIP_COUNT_OFFSET information from the PIP synchronizing generator 103 and is smaller than the PIP_DISP_WIDTH information. Accordingly, the sub-sampler 109 sub-samples only portions displayed among sub-picture decoded at and provided from the sub-picture tuner 106 by using the information (LINE_ENABLE and PIXEL_ENABLE), and stores the sub-sampled sub-picture in the sub-picture frame memory 105. As a result, the control of the sub-picture frame memory 105 becomes simple even when only a portion of the sub-picture is displayed.

Particularly, if the sub-sampler 109 sub-samples and stores only the portion of the sub-picture to be displayed among the received sub-picture in line units, the starting point of the portion of the sub-picture to be displayed is stored beginning from the base of the sub-picture frame memory 105. Since the sub-picture frame memory 105 increases the addresses of the memory with reference to the sub-picture HSYNC, indexing of the memory becomes simple even when only the portion of the sub-picture is displayed. Such operation can be made possible once a sub-sampled number of columns PIP_DISP_WIDTH and a sub-sampled number of lines PIP_DISP_HEIGHT can be obtained, namely from the PIP synchronizing generator 103. The write timing generator 108 then calculates a region or portion of the sub-picture to be displayed, i.e. to be sub-sampled, from the sub-picture data using the PIP_DISP_WIDTH and PIP_DISP_HEIGHT information.

Therefore, the read timing generator 104 reads a sub-picture to be displayed from the sub-picture frame memory 105 when the MAIN_VSYNC, the MAIN_HSYNC, the PIP_VSYNC and the PIP_HSYNC signals are all activated. Because the sub-sampler 109 has stored the sub-picture in the base addresses of the sub-picture frame memory 105, starting from a portion of the sub-picture to be displayed, the addressing of the memory is simple even when only a portion of the sub-picture is displayed. FIGS. 17A~17E and corresponding FIGS. 18A~18E illustrate portions of the sub-picture to be displayed and the data mapping relation to the sub-picture frame memory, wherein only the portion to be displayed is stored in and read from the sub-picture frame memory 105. That is, the stored sub-picture data as shown in FIGS. 18A~18E is read and multiplexed at the multiplexer 110 with the main picture data decoded by the main picture tuner 101. As a result, the sub-picture data is respectively displayed on the screen as shown in FIGS. 17A~17E.

As discussed above, the device and method for processing a sub-picture in a TV receiver according to the present invention permits movement of a sub-picture from one end of a main frame to the other end of the main frame in both left←right and top←bottom directions, thereby allowing a viewer to freely adjust a position of the sub-picture. Particularly, if an absolute size of the sub-picture is positioned outside the main picture, only a portion of the sub-picture positioned on the main picture is displayed and then the sub-picture may be scrolled in left-right or top-bottom directions. Also, a display of only a portion of the sub-picture is made possible with a simple memory addressing, by sub-sampling and storing only a portion of the sub-picture to be displayed in a memory. Since a starting portion of the sub-picture to be displayed is stored in the memory beginning from the base, a sub-picture starting address calculation is not required and thus the indexing of memory becomes simple.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device for processing a sub-picture in a TV receiver, comprising:

an input signal processor which receives and processes an input data including a main picture data and a sub-picture data, said input signal processor generating main picture synchronizing signals and sub-picture synchronizing signals;

a picture-in-picture (PIP) synchronizing generator which receives the main picture synchronizing signals and generates PIP synchronizing signals;

a read timing generator which generates a read signal using the PIP picture synchronizing signals;

a write timing generator which generates a write signal using the sub-picture synchronizing signals and the PIP synchronizing signals;

a sub-sampler which selects and sub-samples a portion of the sub-picture data to be displayed according to the write signal;

a sub-picture frame memory which stores a sub-sampled sub-picture data and presents the stored sub-picture data according to the read signal; and a multiplexer which multiplexes a decoded main picture data from the input signal processor and the sub-picture data read from the sub-picture frame memory, and outputs the multiplexed data for display.

2. A device of claim 1, wherein the PIP synchronizing generator comprises:

a line counter which receives a main picture vertical synchronizing signal MAIN_VSYNC and a main picture horizontal synchronizing signal MAIN_HSYNC, and counts a number of MAIN_HSYNC signals within an effective MAIN_V SYNC signal to output a main picture line information; and a first calculator which receives a corner vertical point coordinate of the sub-picture and a sub-picture height information from an external source and receives the main picture line information, said first calculator generating vertical side related information of the sub-picture to be displayed using the received information.

3. A device of claim 2, wherein the first calculator generates:

synchronizing signals PIP_VSYNC of lines to be displayed as the sub-picture on the main picture;

a PIP_LINE_OFFSET signal representing a line counted starting from a top side of the sub-sampled sub-picture up to which the sub-picture is not to be displayed; and a number of lines PIP_DISP_HEIGHT of the sub-sampled sub-picture to be displayed.

4. A device of claim 3, wherein the PIP_VSYNC signal activated is on a line at which the sub-picture is to be displayed.

5. A device of claim 3, wherein:
the PIP_LINE_OFFSET is set to −PIP_POS_Y and the PIP_DISP_HEIGHT is set to (PIP_HEIGHT+PIP_POS_Y) if the PIP_POS_Y is smaller than and if the PIP_POS_Y is greater than −PIP_HEIGHT, where PIP_HEIGHT is the height of the sub-sampled sub-picture;

the PIP_POS_Y is changed to MAIN_HEIGHT−1, the PIP_LINE_OFFSET is changed to '0' and the PIP_DISP_HEIGHT is changed to '1,' if the PIP_POS_Y is smaller than '0' and if the PIP_POS-Y is smaller than or equal to −PIP_HEIGHT, wherein MAIN-HEIGHT is the height of the main picture;

the PIP_POS_Y is changed to −PIP_HEIGHT+1, the PIP_LINE_OFFSET is changed to PIP_HElGHT−1 and the PIP_DISP_HEIGHT is changed to '1,' if the PIP_POS_Y is not smaller than '0' and if the PIP_POS_Y is greater than or equal to MAIN_HEIGHT;

the PIP_LINE_OFFSET is set to '0' and the PIP_DISP_HEIGHT is equal to PIP_HEIGHT, if the PIP_POS_Y is not smaller than '0,' if the PIP_POS_Y is smaller than MAIN_HEIGHT and if (MAIN_HEIGHT−PIP_POS_Y) is equal to or is greater than PIP_HEIGHT; and otherwise the PIP_LINE_OFFSET is set to '0' and the PIP_DISP_HEIGHT is set to (MAIN_HEIGHT−PIP_POS_Y).

6. A device of claim 1, wherein the PIP synchronizing generator further comprises:
a pixel counter which counts a number of clock pulses in an effective MAIN_HSYNC signal to output main column information; and
a second calculator which receives a corner horizontal point coordinate of the sub-picture and a sub-picture width information from the external source and receives the main column information, said second calculator generating horizontal side related information of the sub-picture to be displayed using the received information.

7. A device of claim 6, wherein the second calculator generates:
synchronizing signals PIP_HSYNC of columns to be displayed as the sub-picture on the main picture;
a PIP_COLUMN_OFFSET signal representing a pixel counted starting from a left most side of the sub-sampled sub-picture up to which the sub-picture is not to be displayed; and
a number of pixels per line PIP_DISP_WIDTH of the sub-sampled sub-picture to be displayed.

8. A device of claim 7, wherein the PIP_HSYNC signal is activated on a column at which the sub-picture is to be displayed.

9. A device of claim 7, wherein:
the PIP_COLUMN_OFFSET is set to −PIP_POS_X and the PIP_DISP_WIDTH is set to (PIP_WIDTH+PIP_POS_X) if the PIP_POS_X is smaller than '0' and if the PIP_POS_X is greater than −PIP_WIDTH, where PIP_WIDTH is the width of the sub-sampled sub-picture;

the PIP_POS_X is changed to MAIN_WIDTH−1, the PIP_COLUMN_OFFSET is changed to '0' and the PIP_DISP_WIDTH is changed to '1,' if the PIP_POS_X is smaller than '0' and if the PIP_POS-X is smaller than or equal to −PIP_WIDTH, wherein MAIN-WIDTH is the width of the main picture;

the PIP_POS_X is changed to −PIP_WIDTH+1, the PIP_COLUMN_OFFSET is changed to PIP_WIDTH−1 and the PIP_DISP_WIDTH is changed to '1,' if the PIP_POS_X is not smaller than '0' and if the PIP_POS_X is greater than or equal to MAIN_WIDTH;

the PIP_COLUMN_OFFSET is set to '0' and the PIP_DISP_WIDTH is equal to PIP_WIDTH, if the PIP_POS_X is not smaller than '0,' if the PIP_POS_X is smaller than MAIN_WIDTH and if (MAIN_WIDTH−PIP_POS_X) is equal to or is greater than PIP_WIDTH; and otherwise the PIP_COLUMN_OFFSET is set to '0' and the PIP_DISP_WIDTH is set to (MAIN_WIDTH−PIP_POS_X).

10. A device of claim 1, wherein the write timing generator comprises:
a line counter which receives a sub-picture vertical synchronizing signal SUB_VSYNC and a horizontal synchronizing signal SUB_HSYNC, and counts a number of SUB_HSYNC signals within an effective SUB_VSYNC signal; and
a first comparator which activates a line enable signal LINE_ENABLE when a value counted by the line counter is greater than a PIP_LINE_OFFSET information and smaller than a PIP_DISP_HEIGHT, where the PIP_LINE_OFFSET represents a line counted starting from a top side of the sub-sampled sub-picture up to which the sub-picture is not to be displayed and the PIP_DISP_HEIGHT represents the number of lines of the sub-sampled sub-picture to be displayed.

11. A device of claim 10, wherein the write timing generator further comprises:
a pixel counter which receives the SUB_VSYNC signal and the SUB_HSYNC signal, and counts a number of clock pulses CLK within an effective SUB_HSYNC signal; and
a second comparator which activates a pixel enable signal PIXEL_ENABLE when the value counted by the pixel counter is greater than a PIP_COLUMN_OFFSET information and smaller than a PIP_DISP_WIDTH information, where a PIP_COLUMN_OFFSET signal represents a pixel counted starting from a left most side of the sub-sampled sub-picture up to which the sub-picture is not to be displayed and the PIP_DISP_WIDTH represents the number of columns of the sub-sampled sub-picture to be displayed.

12. A device of claim 11, wherein:
the first comparator performs a M modulo operation on the count value from the line counter to calculate a height of the sub-sampled sub-picture PIP_HEIGHT, where a quotient from the M modular operation is the PIP_HEIGHT if a remainder is '0' and otherwise the quotient plus a value of '1' is the PIP_HEIGHT; and
the second comparator performs a N modulo operation on the count value from the pixel counter to calculate a width of the sub-sampled sub-picture PIP_WIDTH, where a quotient from the N modular operation is the PIP_WIDTH if a remainder is '0' and otherwise the quotient plus a value of '1' is the PIP_WIDTH.

13. A method for processing a sub-picture in a TV receiver, comprising:
(a1) receiving and processing an input data including a main picture data and a sub-picture data, and generating main picture synchronizing signals and sub-picture synchronizing signals;

(b1) generating picture-in-picture (PIP) synchronizing signals using the main picture synchronizing signals;

(c1) generating a read signal using the PIP synchronizing signals;

(d1) generating a write signal using the sub-picture synchronizing signals and the PIP synchronizing signals;

(e1) sub-sampling a portion of the sub-picture data to be displayed according to the write signal;

(f1) storing a sub-sampled sub-picture data and presenting the stored sub-picture data according to the read signal; and (g1) multiplexing a decoded main picture data and the presented sub-picture data, and outputting the multiplexed data for display.

14. A method of claim 13, wherein (b1) comprises:

(a2) receiving a main picture vertical synchronizing signal MAIN_VSYNC and a main picture horizontal synchronizing signal MAIN_HSYNC, and counting a number of MAIN_HSYNC signals within an effective MAIN_V SYNC signal to output a main picture line information; and (b2) receiving a corner vertical point coordinate of the sub-picture and a sub-picture height information from an external source and receiving the main picture line information, and generating vertical side related information of the sub-picture to be displayed using the received information.

15. A method of claim 14, wherein (b2) generates:

synchronizing signals PIP_VSYNC of lines to be displayed as the sub-picture on the main picture;

a PIP_LINE_OFFSET signal representing a line counted starting from a top side of the sub-sampled sub-picture up to which the sub-picture is not to be displayed; and a number of lines PIP_DISP_HEIGHT of the sub-sampled sub-picture to be displayed.

16. A method of claim 15, wherein the PIP_VSYNC signal is activated on a line at which the sub-picture is to be displayed.

17. A method of claim 15 wherein:

the PIP_LINE_OFFSET is set to −PIP_POS_Y and the PIP_DISP_HEIGHT is set to (PIP_HEIGHT+PIP_POS_Y) if the PIP_POS_Y is smaller than '0' and if the PIP_POS_Y is greater than −PIP_HEIGHT, where PIP_HEIGHT is the height of the sub-sampled sub-picture;

the PIP_POS_Y is changed to MAIN_HEIGHT−1, the PIP_LINE_OFFSET is changed to '0' and the PIP_DISP_HEIGHT is changed to '1,' if the PIP_POS_Y is smaller than '0' and if the PIP_POS-Y is smaller than or equal to −PIP_HEIGHT, wherein MAIN-HEIGHT is the height of the main picture;

the PIP_POS_Y is changed to −PIP_HEIGHT+1, the PIP_LINE_OFFSET is changed to PIP_HEIGHT−1 and the PIP_DISP_HEIGHT is changed to '1,' if the PIP_POS_Y is not smaller than '0' and if the PIP_POS_Y is greater than or equal to MAIN_HEIGHT;

the PIP_LINE_OFFSET is set to '0' and the PIP_DISP_HEIGHT is equal to PIP_HEIGHT, if the PIP_POS_Y is not smaller than '0,' if the PIP_POS_Y is smaller than MAIN_HEIGHT and if (MAIN_HEIGHT−PIP_POS_Y) is equal to or is greater than PIP_HEIGHT; and otherwise the PIP_LINE_OFFSET is set to '0' and the PIP_DISP_HEIGHT is set to (MAIN_HEIGHT−PIP_POS_Y).

18. A method of claim 14, wherein (b1) further comprises:

(c2) counting a number of clock pulses in an effective MAIN_HSYNC signal to output main column information; and (d2) receiving a corner horizontal point coordinate of the sub-picture and a sub-picture width information from the external source and receiving the main column information, and generating horizontal side related information of the sub-picture to be displayed using the received information.

19. A method of claim 18, wherein (d2) generates:

synchronizing signals PIP_HSYNC of columns to be displayed as the sub-picture on the main picture;

a PIP_COLUMN_OFFSET signal representing a pixel counted starting from a left most side of the sub-sampled sub-picture up to which the sub-picture is not to be displayed; and a number of pixels per line PIP_DISP_WIDTH of the sub-sampled sub-picture to be displayed.

20. A method of claim 19, wherein the PIP_HSYNC signal is activated on a column at which the sub-picture is to be displayed.

21. A method of claim 19, wherein:

the PIP_COLUMN_OFFSET is set to −PIP_POS_X and the PIP_DISP_WIDTH is set to (PIP_WIDTH+PIP_POS_X) if the PIP_POS_X is smaller than '0' and if the PIP_POS_X is greater than −PIP_WIDTH, where PIP_WIDTH is the width of the sub-sampled sub-picture;

the PIP_POS_X is changed to MAIN_WIDTH−1, the PIP_COLUMN_OFFSET is changed to '0' and the PIP_DISP_WIDTH is changed to '1,' if the PIP_POS_X is smaller than '0' and if the PIP_POS-X is smaller than or equal to −PIP_WIDTH, wherein MAIN-WIDTH is the width of the main picture;

the PIP_POS_X is changed to −PIP_WIDTH+1, the PIP_COLUMN_OFFSET is changed to PIP_WIDTH−1 and the PIP_DISP_WIDTH is changed to '1,' if the PIP_POS_X is not smaller than '0' and if the PIP_POS_X is greater than or equal to MAIN_WIDTH;

the PIP_COLUMN_OFFSET is set to '0' and the PIP_DISP_WIDTH is equal to PIP_WIDTH, if the PIP_POS_X is not smaller than '0,' if the PIP_POS_X is smaller than MAIN_WIDTH and if (MAIN_WIDTH−PIP_POS_X) is equal to or is greater than PIP_WIDTH; and otherwise the PIP_COLUMN_OFFSET is set to '0' and the PIP_DISP_WIDTH is set to (MAIN_WIDTH−PIP_POS_X).

22. A method of claim 13, wherein (d1) comprises:

(a3) receiving a sub-picture vertical synchronizing signal SUB_VSYNC and a horizontal synchronizing signal SUB_HSYNC, and counting a number of SUB_HSYNC signals within an effective SUB_VSYNC signal; and (b3) activating a line enable signal LINE_ENABLE when a value counted in (a3) is greater than a PIP_LINE_OFFSET information and smaller than a PIP_DISP_HEIGHT, where the PIP_LINE_OFFSET represents a line counted starting from a top side of the sub-sampled sub-picture up to which the sub-picture is not to be displayed and the PIP_DISP_HEIGHT represents the number of lines of the sub-sampled sub-picture to be displayed.

23. A method of claim 22, wherein (d1) further comprises:
(c3) receiving the SUB_VSYNC signal and the SUB_HSYNC signal, and counting a number of clock pulses CLK within an effective SUB_HSYNC signal; and
(d3) activating a pixel enable signal PIXEL_ENABLE when the value counted in (c3) is greater than a PIP_COLUMN_OFFSET information and smaller than a PIP_DISP_WIDTH information, where a PIP_COLUMN_OFFSET signal represents a pixel counted starting from a left most side of the sub-sampled sub-picture up to which the sub-picture is not to be displayed and the PIP_DISP_WIDTH represents the number of columns of the sub-sampled sub-picture to be displayed.

24. A method of claim 23, further comprising:
performing a M modulo operation on the count value from the line counter to calculate a height of the sub-sampled sub-picture PIP_HEIGHT, where a quotient from the M modular operation is the PIP_HEIGHT if a remainder is '0' and otherwise the quotient plus a value of '1' is the PIP_HEIGHT; and
performing a N modulo operation on the count value from the pixel counter to calculate a width of the sub-sampled sub-picture PIP_WIDTH, where a quotient from the N modular operation is the PIP_WIDTH if a remainder is '0' and otherwise the quotient plus a value of '1' is the PIP_WIDTH.

* * * * *